US012447882B2

(12) United States Patent
Choi et al.

(10) Patent No.: US 12,447,882 B2
(45) Date of Patent: Oct. 21, 2025

(54) HEADREST ASSEMBLIES FOR SEATS, METHOD OF USING THE SAME, AND VEHICLES COMPRISING THE SAME

(71) Applicant: GM GLOBAL TECHNOLOGY OPERATIONS LLC, Detroit, MI (US)

(72) Inventors: Hyojun Choi, Incheon (KR); Youngseok Seo, Incheon (KR)

(73) Assignee: GM GLOBAL TECHNOLOGY OPERATONS LLC, Detroit, MI (US)

(*) Notice: Subject to any disclaimer, the term of this patent is extended or adjusted under 35 U.S.C. 154(b) by 174 days.

(21) Appl. No.: 18/515,446

(22) Filed: Nov. 21, 2023

(65) Prior Publication Data

US 2025/0162480 A1    May 22, 2025

(51) Int. Cl.
*B60N 2/806* (2018.01)
*B60N 2/80* (2018.01)

(52) U.S. Cl.
CPC ........ *B60N 2/806* (2018.02); *B60N 2002/899* (2018.02)

(58) Field of Classification Search
CPC .......................... B60N 2/806; B60N 2002/899
USPC ............................................ 297/283.4, 283.1
See application file for complete search history.

(56) References Cited

U.S. PATENT DOCUMENTS

| 6,199,900 B1 * | 3/2001 | Zeigler | B60N 2/882 297/216.12 |
| 9,216,676 B1 * | 12/2015 | Reyes Luna | B60N 2/874 |
| 11,951,062 B2 * | 4/2024 | Lee | B60N 2/0233 |
| 2017/0113581 A1 * | 4/2017 | Mussi | B60N 2/806 |
| 2019/0359105 A1 * | 11/2019 | Kondo | B60N 2/853 |
| 2020/0215949 A1 * | 7/2020 | Carles | B60N 2/806 |
| 2021/0086675 A1 * | 3/2021 | Tait | B60N 2/0264 |
| 2022/0001773 A1 * | 1/2022 | Bohrmann | B60N 2/976 |
| 2024/0308402 A1 * | 9/2024 | Amodeo | B60N 2/0028 |

FOREIGN PATENT DOCUMENTS

| DE | 102015213672 A1 * | 1/2017 | ............. B60N 2/806 |
| DE | 102005030258 B4 * | 1/2021 | ............. B60N 2/976 |
| EP | 1580067 A1 * | 9/2005 | ............. B60N 2/885 |
| JP | 2013189029 A * | 9/2013 | ............. B60N 2/882 |
| JP | 7647437 B2 * | 3/2025 | |
| KR | 20240163951 A * | 11/2024 | ............. A61H 39/04 |

* cited by examiner

*Primary Examiner* — Jose V Chen
(74) *Attorney, Agent, or Firm* — Ingrassia Fisher & Lorenz, LLP | IF&L

(57) ABSTRACT

Headrest assemblies and method of use thereof are provided to support a neck of an occupant of a seat. The headrest assemblies include a headrest cushion, a neck support cushion, and one or more extension members coupling the neck support cushion to the headrest cushion. The extension member(s) are configured to be transitioned between a retracted configuration in which the neck support cushion is adjacent to the headrest cushion and a first dimension is defined along a central longitudinal axis of the extension member(s), and an extended configuration in which the neck support cushion is cantilevered from the headrest cushion and a second dimension is defined along the central longitudinal axis of the extension member(s) that is greater than the first dimension. The extension member(s) are configured to releasably lock to secure the neck support cushion in a fixed position at least while in the extended configuration.

20 Claims, 5 Drawing Sheets

HEADREST ASSEMBLIES FOR SEATS, METHOD OF USING THE SAME, AND VEHICLES COMPRISING THE SAME

INTRODUCTION

The technical field generally relates to vehicle seats, and more particularly relates to a headrest assembly configured to selectively provide neck support to an occupant of a seat.

Vehicle seats are typically constructed to promote comfort, safety, and functionality. However, mass-produced vehicle seats are typically designed to accommodate a wide range of body shapes and sizes. Considerations may include seat width, depth, height, lumbar support, an angle of the seatback, etc. to provide broad comfort and support. Many modern vehicle seats provide for adjustments to a particular user's preferences, such as adjustable lumbar support, seatback angle, and the like. However, certain individuals may desire additional adjustments to address comfort, such as individuals with various medical conditions, injuries, or disabilities. For example, individuals who experience neck pain may desire additional neck support not typically provided by currently available mass-produced vehicle seats.

Accordingly, it is desirable to provide systems and methods for promoting vehicle seat comfort, such as via additional and/or adjustable neck support. Furthermore, other desirable features and characteristics will become apparent from the subsequent detailed description and the appended claims, taken in conjunction with the accompanying drawings and the foregoing introduction.

SUMMARY

A headrest assembly is provided for providing neck support to an occupant of a seat. In one example, the headrest assembly includes a headrest cushion, a neck support cushion, and one or more extension members coupling the neck support cushion to the headrest cushion. The extension member(s) are configured to transition between a retracted configuration and an extended configuration. In the retracted configuration, the neck support cushion is adjacent to the headrest cushion and a first dimension is defined along a central longitudinal axis of the extension member(s). In the extended configuration, the neck support cushion is cantilevered from the headrest cushion and a second dimension is defined along the central longitudinal axis of the extension member(s). The first dimension is less than the second dimension. The extension member(s) are configured to releasably lock to secure the neck support cushion in a fixed position relative to the headrest cushion at least while in the extended configuration. The neck support cushion is configured to support the neck of the occupant of the seat while in the fixed position.

In various examples, the headrest cushion may include a recess configured to receive therein at least a first portion of the neck support cushion while in the retracted configuration. In some examples, while in the retracted configuration, the neck support cushion is fully retracted into the recess such that exterior surfaces of the neck support cushion are flush with adjacent exterior surfaces of the headrest cushion.

In various examples, the headrest assembly may include a headrest cushion hinge pivotally coupling a proximal end of each of the one or more extension members to the headrest cushion, and the headrest cushion hinge is releasably lockable at more than one angle defined between the one or more extension members and the headrest cushion.

In various examples, the headrest assembly may include a neck support cushion hinge pivotally coupling a distal end of each of the one or more extension members to the neck support cushion, and the neck support cushion hinge is releasably lockable at more than one angle defined between the one or more extension members and the neck support cushion.

In various examples, the headrest assembly may include one or more mechanisms configured to release the neck support cushion from the fixed position in response to actuation of the one or more mechanisms.

In various examples, the headrest assembly may include one or more motors configured to position the neck support cushion.

In various examples, the neck support cushion may be configured to decouple from the headrest assembly.

In various examples, the extension member(s) may be configured to release the neck support cushion from the fixed position in response to a force being applied to the neck support cushion in a direction toward the headrest cushion that exceeds a threshold.

A method is provided for supporting a neck of an occupant of a seat. In one example, the method includes extending one or more extension members coupling a headrest cushion of a headrest assembly of the seat to a neck support cushion of the headrest assembly such that the neck support cushion is cantilevered from the headrest cushion, securing the neck support cushion in a fixed position relative to the headrest cushion while the neck support cushion is cantilevered from the headrest cushion, and contacting the neck of the occupant of the seat with the neck support cushion while in the fixed position.

In various examples, extending the extension member(s) may include transitioning between a retracted configuration wherein at least a first portion of the neck support cushion is received within a recess of the headrest assembly and an extended configuration wherein at least some of the first portion of the neck support cushion is removed from the recess.

In various examples, a proximal end of each of the extension member(s) is pivotally coupled to the headrest cushion of the headrest assembly. In such examples, the method may include pivoting the proximal end of each of extension member(s) relative to the headrest cushion to define an angle between the extension member(s) and the headrest cushion, and securing the extension member(s) at the angle.

In various examples, a distal end of each of the one or more extension members are pivotally coupled to the neck support cushion. In such examples, the method may include pivoting the neck support cushion relative to the distal end of each of the extension member(s) to define an angle between the neck support cushion and the extension member(s), and securing the neck support cushion at the angle.

In various examples, the method may include actuating one or more mechanisms to release the neck support cushion from the fixed position.

In various examples, extending the extension member(s) may include activating one or more motors.

In various examples, the method may include decoupling the neck support cushion from the headrest assembly.

In various examples, the method may include automatically releasing the neck support cushion from the fixed position in response to a force being applied to the neck support cushion in a direction toward the headrest cushion that exceeds a threshold.

A vehicle is provided that includes a seat having a headrest assembly. In one example, the headrest assembly of the vehicle includes a headrest cushion configured to support a head of an occupant of the seat, a neck support cushion configured to support a neck of the occupant of the seat, one or more extension members coupling the neck support cushion to the headrest cushion, a first joint pivotally coupling a proximal end of each of the extension member(s) to the headrest cushion, and a second joint pivotally coupling a distal end of each of the extension member(s) to the neck support cushion. The extension member(s) are configured to transition between a retracted configuration and an extended configuration. In the retracted configuration, the neck support cushion is adjacent to the headrest cushion and a first dimension is defined along a central longitudinal axis of the one or more extension members. In the extended configuration, the neck support cushion is cantilevered from the headrest cushion and a second dimension is defined along the central longitudinal axis of the one or more extension members. The first dimension is less than the second dimension. The extension member(s) are configured to releasably lock to maintain a longitudinal length thereof at and between the retracted configuration and the extended configuration. The first joint is configured to be releasably lockable at more than one angle defined between the extension member(s) and the headrest cushion. The second joint is configured to be releasably lockable at more than one angle defined between the extension member(s) and the neck support cushion.

In various examples, the headrest cushion of the vehicle includes a recess configured to receive therein at least a first portion of the neck support cushion while in the retracted configuration such that exterior surfaces of the neck support cushion are flush with adjacent exterior surfaces of the headrest cushion.

In various examples, the extension member(s) of the vehicle are configured to automatically unlock in response to a force being applied to the neck support cushion in a direction toward the headrest cushion that exceeds a threshold.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, brief summary or the following detailed description.

Figure 1:
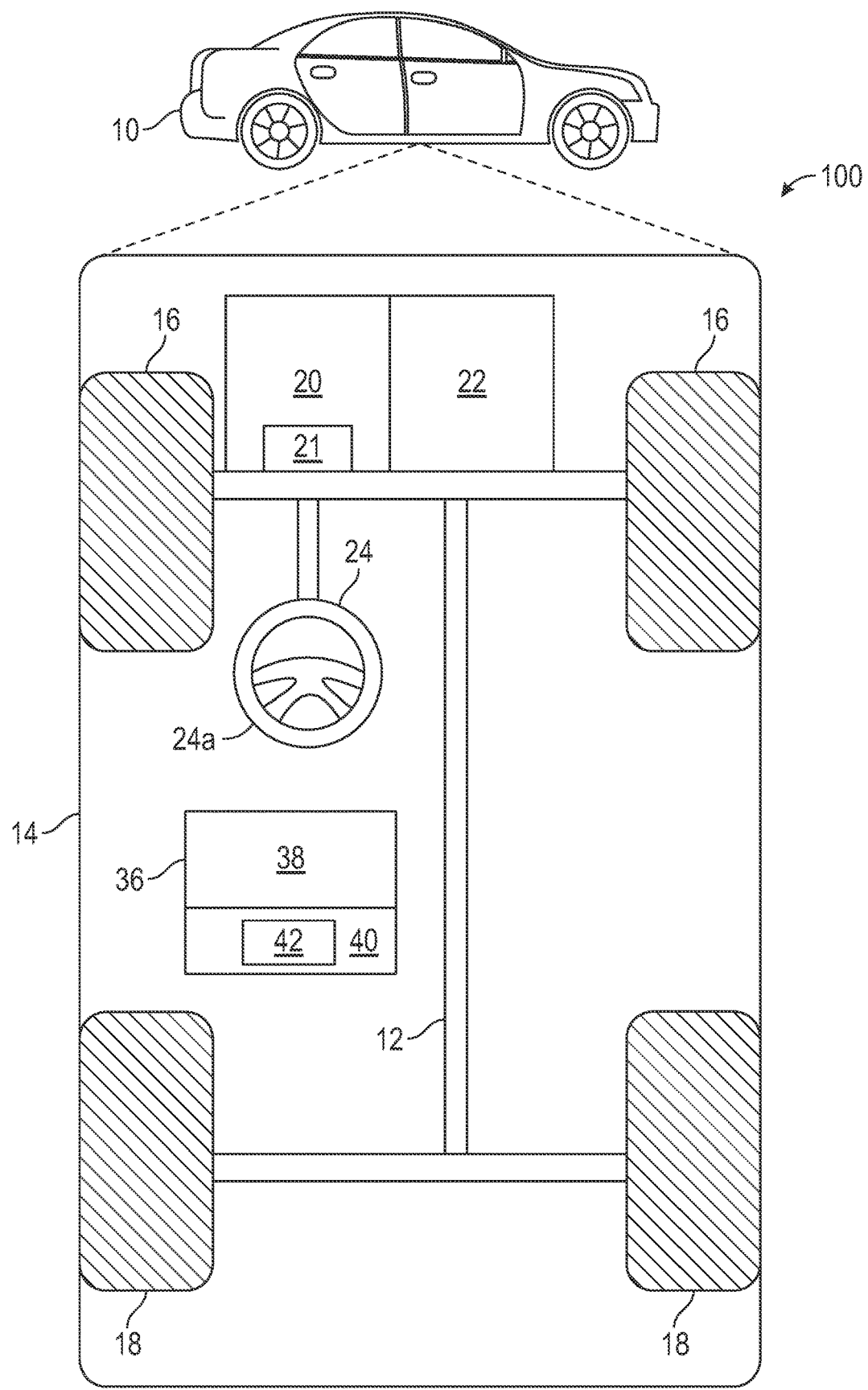
FIG. 1 is a functional block diagram of a vehicle having a headrest assembly in accordance with a nonlimiting example.
Figure 2:
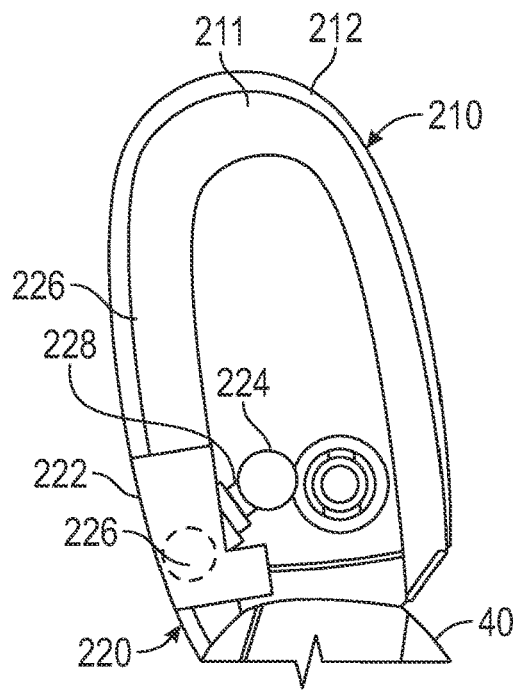
FIG. 2 is a side view illustrating the headrest assembly of FIG. 4 with the neck support assembly in the retracted configuration.

FIG. 1 illustrates a vehicle 10 having one or more seat assemblies 36 that each include neck support assemblies for supporting a neck of an occupant thereof. In certain examples, the vehicle 10 comprises an automobile. In various examples, the vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain examples. In addition, in various examples, it will also be appreciated that the vehicle 10 may comprise any number of other types of mobile platforms (e.g., trains, aircraft, watercraft, etc.).

As depicted in FIG. 1, the exemplary vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

The vehicle 10 further includes a propulsion system 20, a transmission system 22, a steering system 24, and the seat assembly 36. The propulsion system 20 may include various engines and/or motors such as an internal combustion engine 28, such as a gasoline or diesel fueled combustion engine, an electric motor, or a hybrid system. The transmission system 22 is configured to transmit power from the propulsion system 20 to the wheels 16-18 according to selectable speed ratios. According to various examples, the transmission system 22 may include a step-ratio automatic transmission, a continuously-variable transmission, or other appropriate transmission. The steering system 24 influences a position of the wheels 16-18. While depicted as including a steering wheel 24a for illustrative purposes, in some examples contemplated within the scope of the present disclosure, the steering system 24 may not include the steering wheel 24a.

The seat assembly 36 may include a frame (not shown) secured to a floor of the vehicle 10, a seat cushion 38 coupled to the frame, a seatback 40 secured at a lower end thereof to the seat cushion 38 and/or the frame, and a headrest assembly 42 secured to an upper end of the seatback 40. The seat cushion 38 is configured to support an occupant seated thereon, the seatback 40 is configured to support the occupant's back while seated on the seat cushion 38, and the headrest assembly 42 is configured to support the occupant's head. The seat assembly 36 may include various components that provide for adjustment of the seat assembly 36, such as systems for adjusting a height of the seat assembly 36, a recline angle of the seatback 40, lumbar support, and a height of the headrest assembly 42 relative to an upper end of the seatback 40.

FIGS. 2, 3, 4, and 5 present a nonlimiting example of the headrest assembly 42. To facilitate the description provided below of the headrest assembly 42 represented in the figures, relative terms, including but not limited to, "vertical," "horizontal," "front," "rear," "side," "forward," "front," "rear," "rearward," "upper," "lower," etc., may be used in reference to a typical installation of the headrest assembly 42 with the seatback 40 as represented in the figures, and therefore are relative terms that are useful to describe the headrest assembly 42, but should not be necessarily interpreted as limitations to the construction, installation, and/or operation of the headrest assembly 42. In addition, certain aspects of the headrest assembly 42 are described in reference to a coordinate system XYZ represented in FIGS. 4 and 5; however, the coordinate system XYZ is not intended as a limitation to the headrest assembly 42.

The headrest assembly 42 includes a headrest cushion 210 having an exterior surface 211. In some examples, the headrest cushion 210 includes a cushion body formed of, for example, a polymeric foam material encased within a cover formed of, for example, a fabric, polymeric, or leather material.

The headrest assembly 42 includes one or more support members 212 for securing the headrest cushion 210 to the upper end of the seatback 40. In this example, the support members 212 include a pair of rods protruding from a lower end of the headrest cushion 210 that are configured to be slidingly received within bores of a guiding member (not shown) located at and/or within the upper end of the seatback 40 (e.g., entirely or partially concealed within the seatback 40). In various examples, the height of the headrest cushion 210 may be adjustable relative to the upper end of the seatback 40. For example, the headrest cushion 210 may be configured to slide along the support members 212 and be releasably secured at various positions thereon. Alternatively, the support members 212 may be configured to slide within the bores of the guiding member of the seatback 40 and be releasably secured at various positions therein. Systems and components for providing vertical adjustment of the headrest cushion 210 are known in the art and therefore will not be described in further detail herein.

Figure 3:
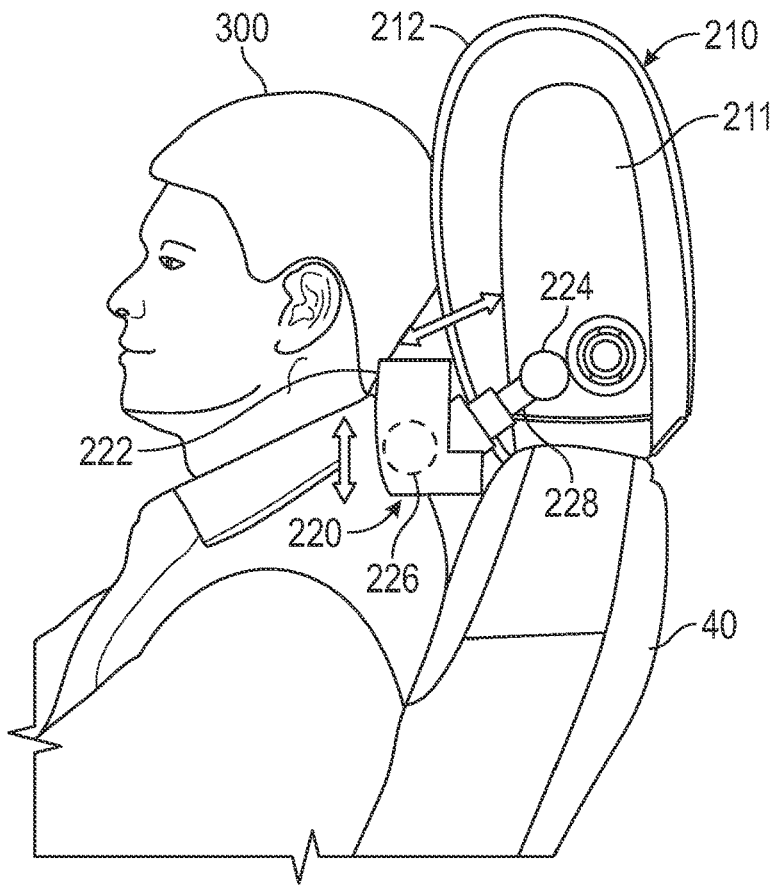
FIG. 3 is a side view illustrating the headrest assembly of FIG. 4 with the neck support assembly in the extended configuration and supporting a neck of an occupant.
Figure 4:
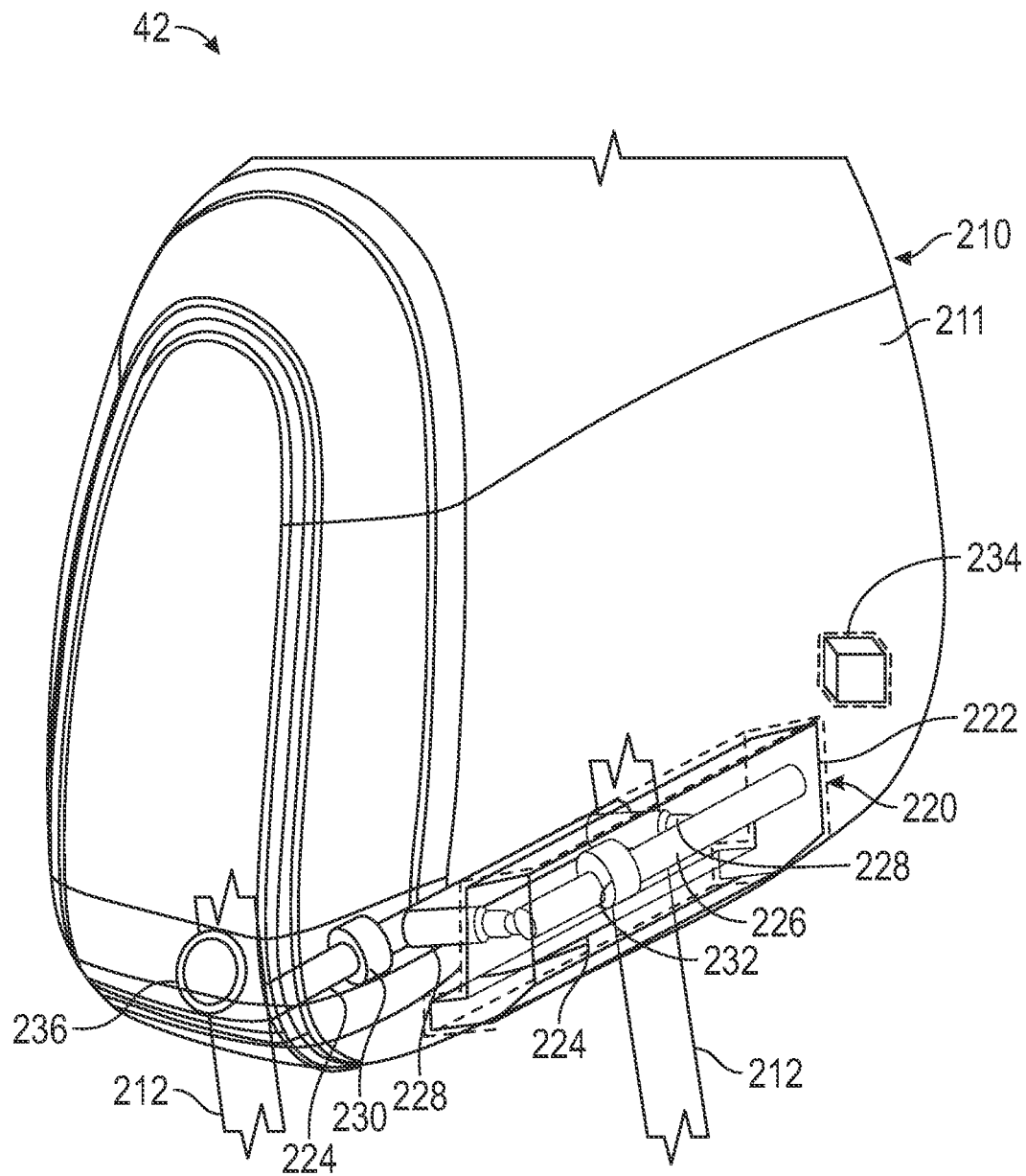
FIG. 4 is perspective view of the headrest assembly of FIG. 1 wherein a neck support assembly thereof is in a retracted configuration in accordance with a nonlimiting example.
Figure 5:
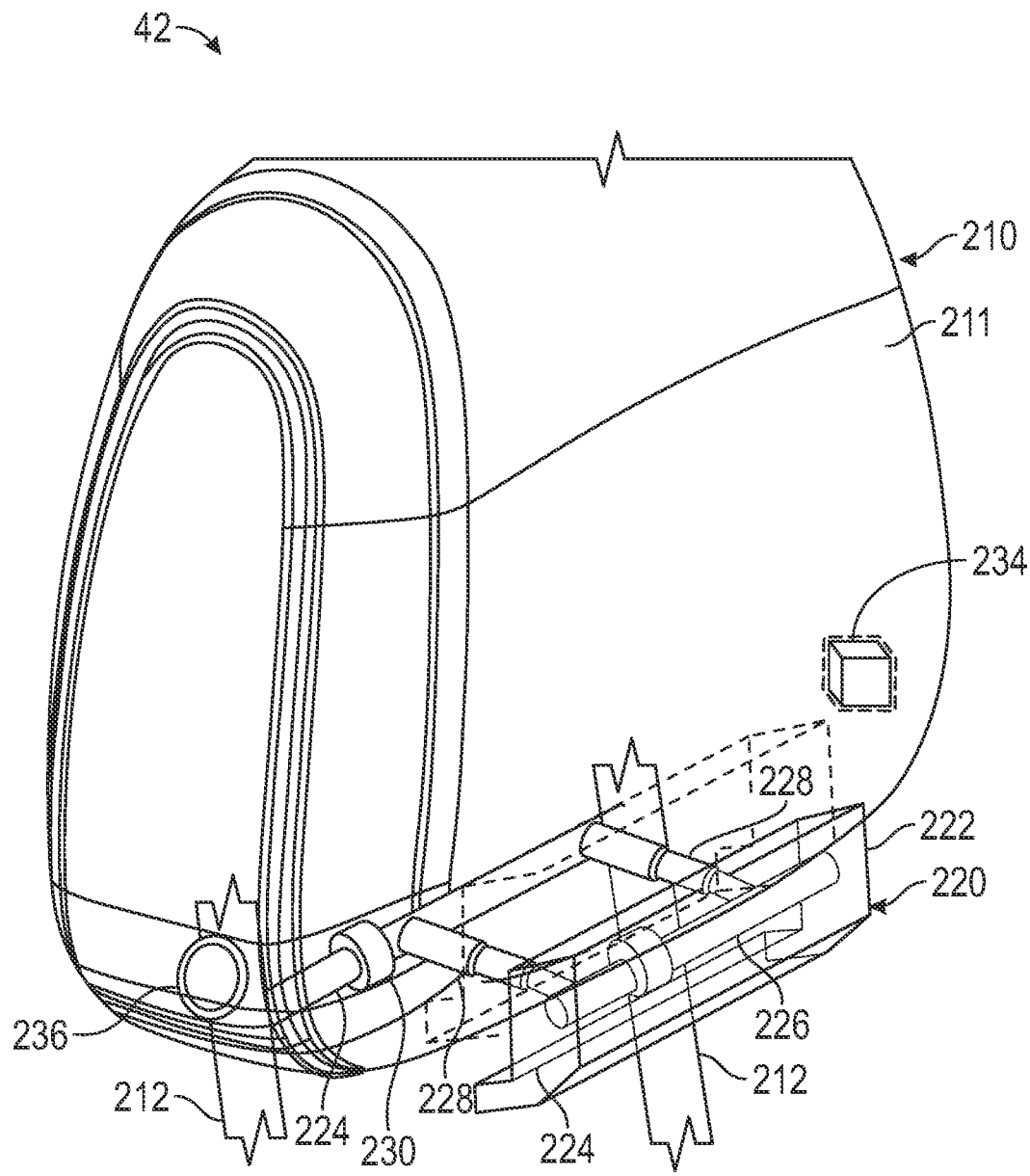
FIG. 5 is perspective view of the headrest assembly of FIG. 1 wherein a neck support assembly thereof is in an extended configuration in accordance with a nonlimiting example.

The headrest assembly 42 includes a neck support assembly 220 configured for supporting a neck of an occupant of the seat assembly 36. The neck support assembly 220 includes a neck support cushion 222 secured to the headrest cushion 210 by one or more extension members 228. The neck support assembly 42 is configured to be transitioned between a retracted configuration (e.g., FIGS. 2 and 4) and an extended configuration (e.g., FIGS. 3 and 5). The neck support assembly 42 may be selectively secured in one or more fixed positions including and between the retracted configuration and the extended configuration. As illustrated in FIG. 3, the neck support assembly 42 may be used to support the neck of the occupant of the seat assembly 36 while in the fixed position(s).

In this example, the neck support assembly 220 includes a headrest cushion hinge 224 (also referred to as the first joint) pivotally coupled to the headrest cushion 210 (or the support members 212 therein), a neck support hinge 226 (also referred to as the second joint) pivotally coupled to the neck support cushion 222, and a pair of extension members 228 extending between and secured to the headrest cushion hinge 224 and the neck support hinge 226. The headrest cushion hinge 224 and the neck support hinge 226 are each individually rotatable about a respective axis of rotation thereof that is disposed along the x-axis, that is, parallel to a plane extending between central longitudinal axes of the pair of support members 212.

In various examples, the headrest cushion hinge 224 and the neck support hinge 226 are each individually lockable or securable in various fixed positions about their respective axes of rotation (e.g., at various degrees of rotation). For example, the headrest cushion hinge 224 may include a headrest cushion hinge locking member 230 configured to prevent or inhibit unintended rotation of the headrest cushion hinge 224 and the neck support hinge 226 may include a neck support hinge locking member 232 configured to prevent or inhibit unintended rotation of the neck support hinge 226. In some examples, the headrest cushion hinge locking member 230 and the neck support hinge locking member 232 may each include a ratchet clutch type mechanism.

Figure 6:
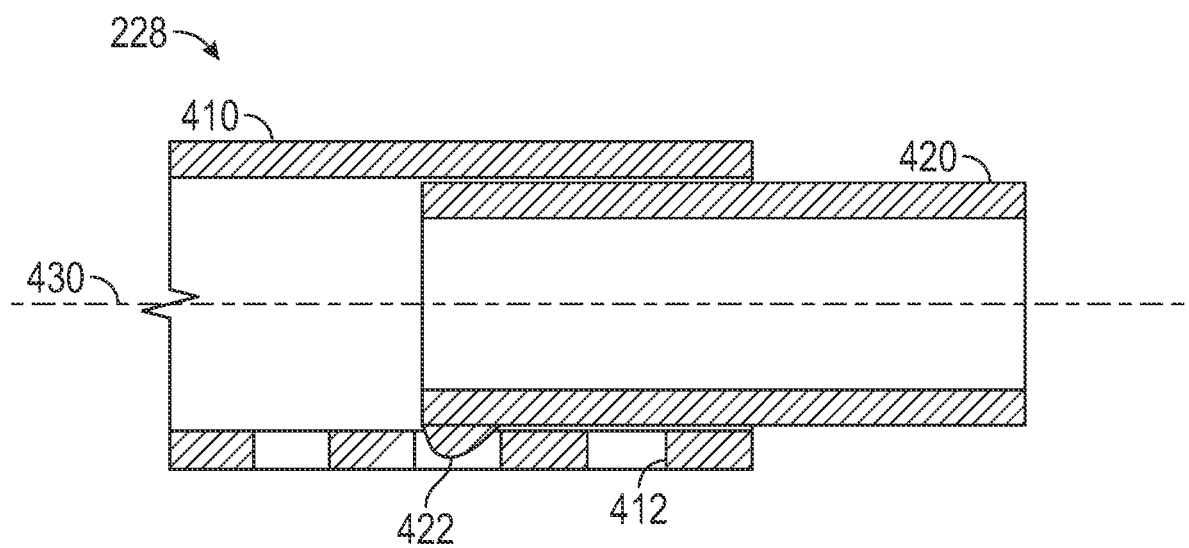
FIG. 6 is a cross-sectional view of a portion of an extension member of the neck support assembly of FIGS. 4 and 5 in accordance with a nonlimiting example.

The extension members 228 may include two or more extendably coupled (e.g., telescopic) members configured for extension and retraction thereof. The extension members 228 may be selectively lockable or securable in various fixed positions including and between a fully retracted position and a fully extended position. For example, FIG. 6 presents a cross-sectional view of a portion of one of the extension members 228 that includes an outer member 410 and an inner member 420. The inner member 420 is configured to slide within the outer member 410 along a common longitudinal axis 430 and thereby extend and/or retract an overall length of the extension member 228. The inner member 420 includes at least one protuberance 422 extending radially from a sidewall thereof that is configured to interact with one or more holes or recesses 412 formed in a sidewall of the outer member 410 to selectively secure the inner member 420 in fixed positions relative to the outer member 410. In some examples, the protuberance 422 may be retractable toward the sidewall of the inner member 420 to release the protuberance 422 from the recesses 412. In some examples, the protuberance 422 may include a curved profile configured to promote release of the protuberance 422 from the recesses 412 upon application of sufficient force in a direction along the axis 430. In some examples, the protuberance 422 may be configured to be released from the recesses 412 and allow retraction of the extension member 228 in response to a force applied in a direction toward the headrest cushion 210 that is in excess of a threshold. Such examples may beneficially reduce a likelihood of injury to an occupant of the seat assembly 36 in the event of a collision.

In some examples, the headrest assembly 42 may include one or more controls or mechanisms (e.g., one or more knobs or buttons) for releasing and/or fixing the positions of the headrest cushion hinge 224, the neck support hinge 226, and/or the extension members 228. For example, the headrest assembly 42 may include a release button 236 configured to simultaneously release or unlock the positions of the headrest cushion hinge 224, the neck support hinge 226, and the extension members 228 while the release button 236 is depressed. In such example, the headrest cushion hinge 224, the neck support hinge 226, and the extension members 228 may be maintained (e.g., locked) in fixed positions while the release button 236 is not depressed.

In some examples, operation of the neck support assembly 220 may be manually controlled. For example, the occupant may manually adjust the neck support assembly 220 to locate the neck support cushion 222 in a desired position, and interact with one or more controls or mechanisms to secure and/or release the neck support cushion 222 in/from the desired position. In other examples, the headrest assembly 42 may include systems and components configured to relocate the neck support cushion 222 using one or more motorized processes. For example, the headrest assembly 42 may include one or more motors 234 (e.g., servomotors) configured to adjust the positions of the headrest cushion hinge 224, the neck support hinge 226, and/or the extension members 228. In such examples, operation of the neck support assembly 220 may be directed by the occupant using one or more mechanisms and/or may be partially or entirely automated. In some examples, the headrest assembly 42 may include or have access to a control module (not shown) configured to store user preferences and automatically adjust the neck support assembly 220 based on the stored user preferences. The control module may include any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

The neck support cushion 222 may have various shapes and exterior profiles. In some examples, the headrest cushion 210 may include a recess for receiving the neck support cushion 222. In such examples, the neck support cushion 222 may have an exterior profile configured such that, while in the retracted configuration wherein the neck support cushion is fully retracted into the recess, exterior surfaces of the neck support cushion 222 are substantially flush with adjacent exterior surfaces 211 of the headrest cushion 210 and/or contoured to continue a profile of the adjacent exterior surfaces 211. In this manner, the exterior profile of the headrest assembly 42 while in the retracted configuration may be substantially similar to a headrest assembly that does not include the neck support assembly 220. In some examples, the shape, texture, firmness, and/or exterior profile of the neck support cushion 222 may be configured to specific preferences of the occupant or for a specific purpose. For example, the neck support cushion 222 may be configured to provide neck support in a manner that accommodates certain medial conditions. In such examples, the neck support cushion 222 may be configured to support the occupant's neck in a manner that avoids or reduces neck pain associated with the medical condition. In some examples, the neck support assembly 220 may be configured to promote ease of removal of the neck support cushion 222. This may allow individual occupants to replace the neck support cushion 222 on demand to promote comfort in vehicles that may be driven and/or used by more than one individual. For example, the neck support cushion 222 may be releasably coupled to the neck support hinge 226, the neck support hinge 226 may be releasably coupled to the extension members 228, the extension members 228 may be releasably coupled to the headrest cushion hinge 224, and/or the headrest cushion hinge 224 may be releasably coupled to the headrest cushion 210 (or the support members 212).

Figure 7:
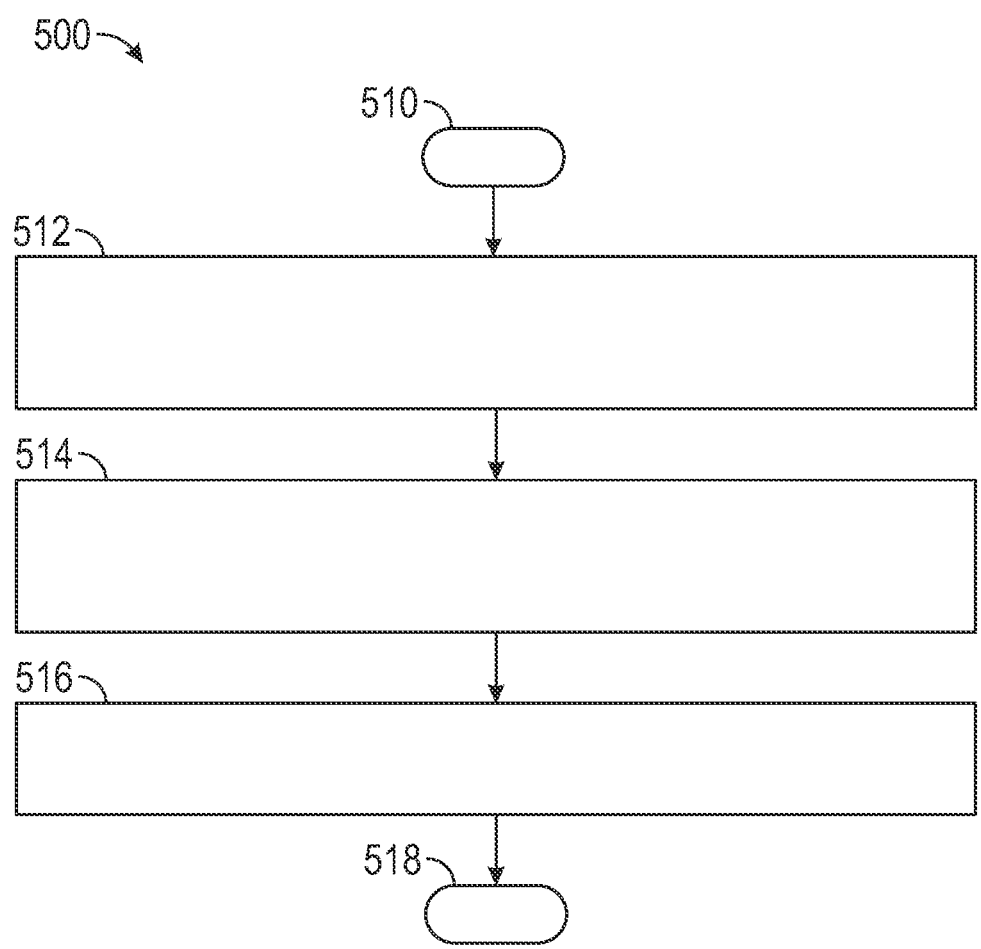
FIG. 7 is a flow chart illustrating a method for supporting a neck of an occupant of a seat in accordance with a nonlimiting example.

With reference now to FIG. 7 and with continued reference to FIGS. 1-6, a flowchart representing a method 500 is provided for using the neck support assembly 220 of the headrest assembly 42, in accordance with certain examples. As can be appreciated in light of the disclosure, the order of operation within the method 500 is not limited to the sequential execution as illustrated in FIG. 7, but may be performed in one or more varying orders as applicable and in accordance with the present disclosure.

In one example, the method 500 may start at 510. At 512, the method 500 may include extending the extension members 228 coupling the headrest cushion 210 to the neck support cushion 222 such that the neck support cushion 222 is cantilevered from the headrest cushion 210. At 514, the method 500 may include securing the neck support cushion 222 in a fixed position relative to the headrest cushion 210 while the neck support cushion 222 is cantilevered from the headrest cushion 210. In some examples, securing the neck support cushion 222 in the fixed position may include locking the extension members 228 to maintain a longitudinal length thereof at and between the retracted configuration and the extended configuration.

In some examples, the method 500 may include pivoting the proximal end of each of the extension members 228 relative to the headrest cushion 210 to define a first angle between the extension members 228 and the headrest cushion 210. In such examples, securing the neck support cushion 222 in the fixed position may include securing the extension members 228 at the first angle.

In some examples, the method 500 may include pivoting the neck support cushion 222 relative to the distal end of each of the extension members 228 to define a second angle between the neck support cushion 222 and the extension members 228. In such examples, securing the neck support cushion 222 in the fixed position may include securing the neck support cushion 222 at the second angle.

At 516, the method 500 may include contacting the neck of the occupant of the seat with the neck support cushion 222 while in the fixed position. The method 500 may end at 518.

The headrest assemblies, seats, vehicles, and methods disclosed herein provide various benefits over certain existing systems and methods. For example, the headrest assemblies are capable of supporting a neck of an occupant. In some examples, the neck support assembly may be collapsible in response to sufficient force applied thereto, such as a vehicular collision, and thereby reduce a likelihood of injury to the occupant. In some examples, the neck support assembly may be retractable in a manner such that the neck support assembly imposes little to no change in the comfort and use of the headrest assembly relative to existing headrest assemblies that do not provide neck support.

Although the headrest assemblies are discussed herein with reference to seats disposed within vehicles and mobile platforms, various aspects of the headrest assemblies may apply to other applications. As nonlimiting examples, the headrests assemblies, including the headrest assembly 42, may be configured for use on chairs, recliners, couches, benches, and other furniture or seating applications.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A headrest assembly for a seat, comprising:
    a headrest cushion;
    a neck support cushion;
    one or more extension members coupling the neck support cushion to the headrest cushion, wherein the one or more extension members are configured to telescopically transition between a retracted configuration and an extended configuration, wherein in the retracted configuration the neck support cushion is adjacent to the headrest cushion and a first dimension is defined along a central longitudinal axis of the one or more extension members, wherein in the extended configuration the neck support cushion is cantilevered from the headrest cushion and a second dimension is defined along the central longitudinal axis of the one or more extension members, wherein the first dimension is less than the second dimension, wherein the one or more extension members are configured to releasably lock to secure the neck support cushion in a fixed position relative to the headrest cushion at least while in the extended configuration, wherein the neck support cushion is configured to support a neck of an occupant of the seat while in the fixed position;

a headrest cushion hinge pivotally coupling a proximal end of each of the one or more extension members to the headrest cushion, wherein the headrest cushion hinge is releasably lockable at more than one angle defined between the one or more extension members and the headrest cushion; and a neck support cushion hinge pivotally coupling a distal end of each of the one or more extension members to the neck support cushion, wherein the neck support cushion hinge is releasably lockable at more than one angle defined between the one or more extension members and the neck support cushion.

2. The headrest assembly of claim 1, wherein the headrest cushion includes a recess configured to receive therein at least a first portion of the neck support cushion while in the retracted configuration.

3. The headrest assembly of claim 2, wherein while in the retracted configuration the neck support cushion is fully retracted into the recess such that exterior surfaces of the neck support cushion are flush with adjacent exterior surfaces of the headrest cushion.

4. The headrest assembly of claim 1, further comprising one or more mechanisms configured to release the neck support cushion from the fixed position in response to actuation of the one or more mechanisms.

5. The headrest assembly of claim 1, further comprising one or more motors configured to position the neck support cushion.

6. The headrest assembly of claim 1, wherein the neck support cushion is configured to decouple from the headrest assembly.

7. The headrest assembly of claim 1, wherein each of the one or more extension members include an outer member and an inner member, wherein the inner member is configured to slide within the outer member along the central longitudinal axis and thereby extend and/or retract an overall length of the one or more extension members, wherein the inner member includes at least one protuberance extending radially from a sidewall thereof that is configured to interact with one or more holes or recesses formed in a sidewall of the outer member to selectively secure the inner member in predetermined fixed positions relative to the outer member, wherein the at least one protuberance is retractable toward the sidewall of the inner member to release the at least one protuberance from the one or more holes or recesses, wherein the at least one protuberance includes a curved profile configured to promote release of the at least one protuberance from the one or more holes or recesses upon application of a force in a direction along the central longitudinal axis that is in excess of a threshold.

8. The headrest assembly of claim 1, wherein the one or more extension members are each releasable coupled to the headrest cushion, and the neck support cushion is releasable coupled to each of the one or more extension members.

9. The headrest assembly of claim 1, wherein the one or more extension members are configured to release the neck support cushion from the fixed position in response to a force being applied to the neck support cushion in a direction toward the headrest cushion that exceeds a threshold.

10. A method for supporting a neck of an occupant of a seat, comprising:
telescopically extending one or more extension members coupling a headrest cushion of a headrest assembly of the seat to a neck support cushion of the headrest assembly such that the neck support cushion is cantilevered from the headrest cushion;
pivoting a proximal end of each of the one or more extension members, that is pivotally coupled to the headrest cushion of the headrest assembly, relative to the headrest cushion to define a first angle between the one or more extension members and the headrest cushion;
securing the one or more extension members at the first angle;
pivoting the neck support cushion, that is pivotally coupled to a distal end of each of the one or more extension members, relative to the distal end of each of the one or more extension members to define a second angle between the neck support cushion and the one or more extension members;
securing the neck support cushion at the second angle and in a fixed position relative to the headrest cushion while the neck support cushion is cantilevered from the headrest cushion; and
contacting the neck of the occupant of the seat with the neck support cushion while in the fixed position.

11. The method of claim 10, wherein extending the one or more extension members includes transitioning between a retracted configuration wherein at least a first portion of the neck support cushion is received within a recess of the headrest assembly and an extended configuration wherein at least some of the first portion of the neck support cushion is removed from the recess.

12. The method of claim 10, further comprising actuating one or more mechanisms to release the neck support cushion from the fixed position.

13. The method of claim 10, wherein extending the one or more extension members includes activating one or more motors.

14. The method of claim 10, further comprising decoupling the neck support cushion from the headrest assembly.

15. The method of claim 10, further comprising automatically releasing the neck support cushion from the fixed position in response to a force being applied to the neck support cushion in a direction toward the headrest cushion that exceeds a threshold.

16. The method of claim 10, wherein telescopically extending one or more extension members includes:
sliding an inner member of the one or more extension members within an outer member of the one or more extension members along the central longitudinal axis and thereby extend and/or retract an overall length of the one or more extension members; and
interacting at least one protuberance extending radially from a sidewall of the inner member with one or more holes or recesses formed in a sidewall of the outer member to selectively secure the inner member in predetermined fixed positions relative to the outer member;

wherein the method includes retracting the at least one protuberance toward the sidewall of the inner member to release the at least one protuberance from the one or more holes or recesses upon application of a force in a direction along the central longitudinal axis that is in excess of a threshold defined by a curved profile of the at least one protuberance.

17. A vehicle, comprising:
a seat having a headrest assembly, the headrest assembly including:
  a headrest cushion configured to support a head of an occupant of the seat;
  a neck support cushion configured to support a neck of the occupant of the seat;
  one or more extension members coupling the neck support cushion to the headrest cushion, wherein the one or more extension members are configured to telescopically transition between a retracted configuration and an extended configuration, wherein in the retracted configuration the neck support cushion is adjacent to the headrest cushion and a first dimension is defined along a central longitudinal axis of the one or more extension members, wherein in the extended configuration the neck support cushion is cantilevered from the headrest cushion and a second dimension is defined along the central longitudinal axis of the one or more extension members, wherein the first dimension is less than the second dimension, wherein the one or more extension members are configured to releasably lock to maintain a longitudinal length thereof at and between the retracted configuration and the extended configuration;
  a first joint pivotally coupling a proximal end of each of the one or more extension members to the headrest cushion, wherein the first joint is releasably lockable at more than one angle defined between the one or more extension members and the headrest cushion; and
  a second joint pivotally coupling a distal end of each of the one or more extension members to the neck support cushion, wherein the second joint is releasably lockable at more than one angle defined between the one or more extension members and the neck support cushion.

18. The vehicle of claim 17, wherein the headrest cushion includes a recess configured to receive therein at least a first portion of the neck support cushion while in the retracted configuration such that exterior surfaces of the neck support cushion are flush with adjacent exterior surfaces of the headrest cushion.

19. The vehicle of claim 17, wherein the one or more extension members are configured to automatically unlock in response to a force being applied to the neck support cushion in a direction toward the headrest cushion that exceeds a threshold.

20. The vehicle of claim 17, wherein each of the one or more extension members include an outer member and an inner member, wherein the inner member is configured to slide within the outer member along the central longitudinal axis and thereby extend and/or retract an overall length of the one or more extension members, wherein the inner member includes at least one protuberance extending radially from a sidewall thereof that is configured to interact with one or more holes or recesses formed in a sidewall of the outer member to selectively secure the inner member in predetermined fixed positions relative to the outer member, wherein the at least one protuberance is retractable toward the sidewall of the inner member to release the at least one protuberance from the one or more holes or recesses, wherein the at least one protuberance includes a curved profile configured to promote release of the at least one protuberance from the one or more holes or recesses upon application of a force in a direction along the central longitudinal axis that is in excess of a threshold.

* * * * *